Patented Dec. 30, 1924.

1,520,823

UNITED STATES PATENT OFFICE.

PAUL KESTNER, OF BOULOGNE-SUR-SEINE, FRANCE.

PROCESS OF ABSTRACTING GASES FROM WATER BY MEANS OF METALLIC FILTERS.

No Drawing.    Application filed April 16, 1921.   Serial No. 461,924.

*To all whom it may concern:*

Be it known that I, PAUL KESTNER, citizen of the French Republic, residing at Boulogne-sur-Seine, Department of the Seine, in France, have invented certain new and useful Improvements in Processes of Abstracting Gases from Water by Means of Metallic Filters; and I do hereby declare the following to be a full, clear, and exact description of the invention, such as will enable others skilled in the art to which it appertains to make and use the same.

In employing iron filings and turnings in a filter for the purpose of extracting the oxygen dissolved in water, the continuity of the operation is limited by the formation on the surface of the iron of a coating or layer of ferric hydroxide or rust, $Fe(OH)_3$. This layer weakens and diminishes the contact between the oxygen and the non-oxidized iron; it adheres firmly to the iron and produces rapid clogging of the filter with a very rapid increase of loss of charge in the filter.

In accordance with the invention this defect may be obviated in the following manner:

A part of the filter is shut off, or placed out of circuit, and is kept full of water during the time necessary for regeneration. The ferric hydroxide, iron and water react to produce ferrous hydroxide and hydrogen as follows:

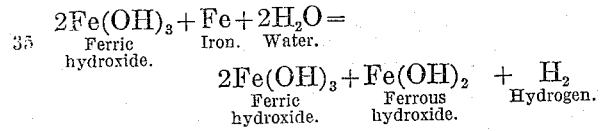

The nascent hydrogen thus liberated combines, as fast as it is formed, with more ferric hydroxide, reducing it to ferrous hydroxide as follows:

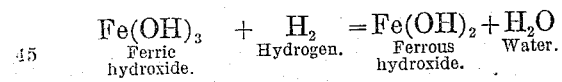

The longer this part of the filter is kept out of circuit, the more ferric hydroxide will be reduced to ferrous hydroxide, as above outlined. The filter is then placed in circuit again, the ferrous hydroxide again absorbs oxygen and is converted into ferric hydroxide as before. When the objectionable layer again forms on the surface of the iron, the filter may again be shut off or thrown out of circuit, and again allowed to recuperate. It will be noted that the process, as a whole, forms a closed cycle.

To sum up, the contact of the iron and the rust in the presence of water brings about the formation of ferrous hydroxide, which is capable of changing directly into ferric hydroxide or rust on absorbing oxygen again when the apparatus is once more put into action. The ferrous hydroxide has the advantage of not adhering to the iron, and can be removed by directing a current of water or steam upon or through the filtering medium, or by stirring by mechanical means.

This process constitutes a closed cycle, renewable until oxidation of the iron is complete. It has been stated above that a part of the filter is stopped during the time necessary for regeneration by being placed out of circuit and kept full of water. To put filters out of action is not always possible in many installations: one filter can only be placed out of circuit temporarily, and in certain cases this is not possible at any moment. To obviate this inconvenience it suffices to work in the following manner:

More oxygen is absorbed at the inlet end of the filter than at other points and if the filter is efficient absorption is complete before the rear portion of the filter is reached, the water circulating there being entirely freed from gas. Before the action of the apparatus becomes reduced, the direction of flow of the water is reversed, the water, freed of oxygen, then passing first over the least oxidized iron, and the more oxidized portion being then at the other end of the filter and no longer acting but capable of regenerating itself, by the reaction between the iron and the rust in the presence of the gas-free water. Thus the whole filter works and regenerates itself alternately in an approximately regular manner. This arrangement may be perfected by placing a mass of the filtering medium at the inlet and at the outlet of the iron-filter.

When the flow of water is variable it may be distributed progressively to the filters by suitable means and in such a manner that all the filters in use receive a definite quantity of water, one element entering or leaving the circuit at each increase or reduction of the flow. At times when the flow of the water is not at the maximum, there will thus be filters out of circuit in which the regeneration is effected. The filters being always taken in the same order for service, it is possible, by changing the filter taken as the starting point each day, to obtain a circular permutation of the apparatuses in use and in this way bring about regular working and regeneration of each filtering element.

It will thus be seen that when the efficiency of the filter becomes impaired by the formation of ferric hydroxide, by the above process this can be converted into a lower hydrated form, that is to say, into ferrous hydroxide, after which the filter may again be placed in circuit. It will also be observed that the process constitutes what may be termed a closed cycle, as the ferrous hydroxide is gradually reconverted into ferric hydroxide, when the process may be repeated.

Claims:

1. The method of treating adherent rust formed on the surfaces of iron filter masses in the extraction of oxygen from water which comprises effecting reaction between the iron and the rust in the presence of water to convert the rust into a lower hydrated form.

2. The method of treating adherent rust formed on the surfaces of iron filter masses in the extraction of oxygen from water which comprises effecting reaction between the iron and the rust in a quiescent body of water to convert the rust into a lower hydrated form.

In testimony whereof I affix my signature.

PAUL KESTNER.